(12) United States Patent
Roztocil et al.

(10) Patent No.: US 6,995,860 B2
(45) Date of Patent: Feb. 7, 2006

(54) SYSTEM AND METHOD FOR VISUAL REPRESENTATION OF TABS IN A PRODUCTION PRINTING WORKFLOW

(75) Inventors: Tomas Roztocil, Caledonia, NY (US); Ronald F. Savino, Rochester, NY (US); David R. Hansen, Honeoye Falls, NY (US); Robert K. Holzwarth, Palmyra, NY (US)

(73) Assignee: Eastman Kodak Company, Rochester, NY (US)

( * ) Notice: Subject to any disclaimer, the term of this patent is extended or adjusted under 35 U.S.C. 154(b) by 879 days.

(21) Appl. No.: 09/803,166

(22) Filed: Mar. 9, 2001

(65) Prior Publication Data

US 2001/0043346 A1 Nov. 22, 2001

Related U.S. Application Data

(63) Continuation-in-part of application No. 09/573,093, filed on May 17, 2000.

(51) Int. Cl.
*G06F 15/00* (2006.01)

(52) U.S. Cl. .................. 358/1.18; 358/1.12; 358/1.17; 358/1.13

(58) Field of Classification Search .............. 358/1.18, 358/1.15, 1.16, 1.12–1.13, 296; 400/61, 400/63; 345/84–85; 715/764, 526; 399/87
See application file for complete search history.

(56) References Cited

U.S. PATENT DOCUMENTS 5,699,494 A   12/1997  Colbert et al. .............. 395/114
5,718,520 A * 2/1998  MacKay ....................... 400/61
5,760,775 A * 6/1998  Sklut et al. ................... 345/839
5,946,461 A   8/1999  Landry et al. ............... 395/117
5,978,559 A * 11/1999 Quinion ....................... 358/1.15
6,026,258 A   2/2000  Fresk et al. ................... 399/87
6,134,568 A   10/2000 Tonkin ......................... 707/526
6,213,652 B1 * 4/2001  Suzuki et al. ............... 358/1.15

FOREIGN PATENT DOCUMENTS

WO        WO 01/67226        9/2001

OTHER PUBLICATIONS

Manual, "Adobe® "Portable Document Formal Reference Manual, Version 1.3, pp. 2-518.
"Adobe® Acrobat 4.0 Guide," pp. 1-595.

(Continued)

*Primary Examiner*—Twyler Lamb

(57) ABSTRACT

A system and method for managing production printing workflow is disclosed. The system includes workflow management software which manages and facilitates the procedural stages of the workflow including job origination, job preparation, job submission and job fulfillment. The workflow management software provides an integrated object oriented interface which visually reflects and interacts with the workflow. The software further provides functionality for efficient page level modifications to documents at the job preparation stage. This functionality allows such modifications to be easily made to selected pages and visually verified by displaying visual representations of the modifications on visual representations of the pages. In particular, the insertion and attributes of ordered media, such as tab separator pages, is visually represented. This allows an operator to visually verify ordered media ordering and placement and coordinate with the production output device to properly insert and efficiently utilize the ordered media.

54 Claims, 7 Drawing Sheets

OTHER PUBLICATIONS

Brochure, "Quite Imposing Plus Online Guide 1.2.".
Brochure, "W3C Extensible Markup Language (SML) 1.0," W3C Recommendation Feb. 10, 1998, pp. 1-32.
Brochure, "StampPDF™ Users Guide—An Acrobat Plugin," pp. 6-82, © 1999 Digital Applications, Inc.
Brochure, "TIFF™ Revision 6.0" Specification, pp. 4-120.
Manual, "TWAIN Specification Version 1.8," pp. 1-516.
Manual, "Open Document Management API, Version 2.0," pp. 1-87.
Brochure Guide, "Network Imaging System Interface Development Guide, Release 2," pp. 1-1-6-4.
Dan Phelps and John Thompson, "Rendering For Electronic Printers and Copiers," pp. 1-72.
Kodak Publication No. FN9074 May 1985—"Fundamentals of Digital Copiers—Revision 1," pp. 1-49.
Heidelberg Digital L.L.C. "TabMaker Software" setup windows printout, ©2000 Heidelberg Digital L.L.C., coded by Ron Savino.
Alto Imaging Technologies® "Image Arranger" Installation and Quick Reference, pp. 1-23, Revised May 28, 2001.

* cited by examiner

SYSTEM AND METHOD FOR VISUAL REPRESENTATION OF TABS IN A PRODUCTION PRINTING WORKFLOW

RELATED APPLICATIONS

This application is a continuation-in-part under 37 C.F.R. § 1.53(b) of U.S. patent application Ser. No. 09/573,093, entitled "SYSTEM AND METHOD FOR VISUAL REPRESENTATION OF PAGES IN A PRODUCTION PRINTING WORKFLOW", filed May 17, 2000 now U.S. Pat. No. 6,462,756, the entire disclosure of which is hereby incorporated by reference.

The following co-pending and commonly assigned U.S. Patent Application has been filed on the same date as the present application. This application relates to and further describes other aspects of the embodiments disclosed in the present application and is herein incorporated by reference.

U.S. patent application Ser. No. 09/803,387, "SYSTEM AND METHOD FOR VISUAL REPRESENTATION AND MANIPULATION OF TABS ON A PRODUCTION PRINTER", filed concurrently herewith.

BACKGROUND

While just about every computer user owns their own printer and is capable of producing high quality documents, the ability to produce such documents in high volume and with special finishing features, such as binding, is still within the purview of the commercial print shops and corporate copy departments. High volume, finished production of documents is typically referred to as production printing. A production printer is a printing device capable of rapid production of large volumes of documents. Typically these printers have high paper handling capacity, the ability to draw on multiple media types from multiple sources and the ability to automatically finish a document such as by adding a binding. Despite the automation provided by the production printer and the proliferation of computer technology, especially in the area of desktop publishing, production printing is still a complicated and often manual process.

In a typical print shop, customers bring in original documents which they want turned into a finished product such as a bound booklet, a tri-fold brochure or a tabbed three ring bound notebook. In addition, they typically need a large volume of the finished product, for example, one thousand brochures. The combination of the original documents plus the instructions for producing the finished product is called a "job". The documents can be brought in either in hard copy or electronic form, such as on floppy disk, compact disc or tape or can be transmitted to the print shop over a network such as the Internet.

After handing over the documents to the clerk, the customer relays his instructions for preparing the finished product. The clerk will note these instructions on a "ticket" or "job ticket". The job ticket is typically a piece of paper with all of the instructions written on it for producing the finished product. As mentioned above, this is known as job. The job will then be handed to an operator, who runs the production printer, to produce the finished output. The operator's job is to prepare the document for production, load the appropriate materials, such as paper stock and binding materials, into the production printer and ensure that the finished output is correct.

While the job of the operator seems simple, there are many issues which quickly complicate it. Often, the documents provided by a customer are not ready to be run on the production printer. Some documents provided by a customer are merely raw manuscripts requiring basic formatting, such as margins, typography, etc. Other documents may be formatted but such formatting might not take into account the requested binding. For example, the text of the document is too close to the margin, therefore, when the finished product is bound, some of the text will be obscured. Some documents, such as books, require special care so that, for example, the first page of every chapter appears on the front of a page, also known as imposition. Other forms of imposition include booklet/pamphlet imposition or n-up imposition. Or the customer may bring in multiple documents and ask that these "chapters" be assembled into a book, with a cover and binding.

Other issues which complicate the production printing job are determining and loading the correct media into the production printer. Often, jobs will require many different paper types, such as different stock weights or different colors. In addition, some jobs require the insertion of tab stock at specific points within the document. Still other jobs may require the adding of a Bates number or other annotation to the document.

With such a complicated production process to produce finished output, errors are bound to occur, such as loading the wrong paper stock in the printer or setting a margin too close to a binding. Production printers run at very high speeds, often producing output greater than 1 page per second therefore, errors in the finished output may not be caught before a significant amount of time and resources have been wasted.

Accordingly, there is a need for an efficient system and method for managing the production printing workflow.

SUMMARY

The present invention is defined by the following claims, and nothing in this section should be taken as a limitation on those claims. By way of introduction, the preferred embodiments described below relate to an interface, implemented in a computer, for representing and managing insertion of ordered media into a document in a production printing workflow management system, the system comprising a display, the document comprising content and formatting, the formatting defining at least one page in the document. The interface includes a first user input device for receiving at least one ordered media attribute, the at least one ordered media attribute specifying at least one ordered media page to be inserted in the document. Further, the interface includes first program logic coupled with the first user input and operative to generate the ordered media page into the document according to the at least one ordered media attribute. In addition, the interface includes a first output device operative to display a visual representation of the at least one ordered media page on the display according to the at least one ordered media attribute.

The preferred embodiments further relate to a method of representing and managing insertion of ordered media into a document in a production printing workflow management system, the system comprising a display, the document comprising content and formatting, the formatting defining at least one page in the document. The method comprises receiving at least one ordered media attribute, the at least one ordered media attribute specifying at least one ordered media page to be inserted in the document; generating the ordered media page into the document according to the at least one ordered media attribute; and displaying a visual representation of the at least one ordered media page on the display according to the at least one ordered media attribute.

Further aspects and advantages of the invention are discussed below in conjunction with the preferred embodiments.

DETAILED DESCRIPTION OF THE PRESENTLY PREFERRED EMBODIMENTS

Figure 1:
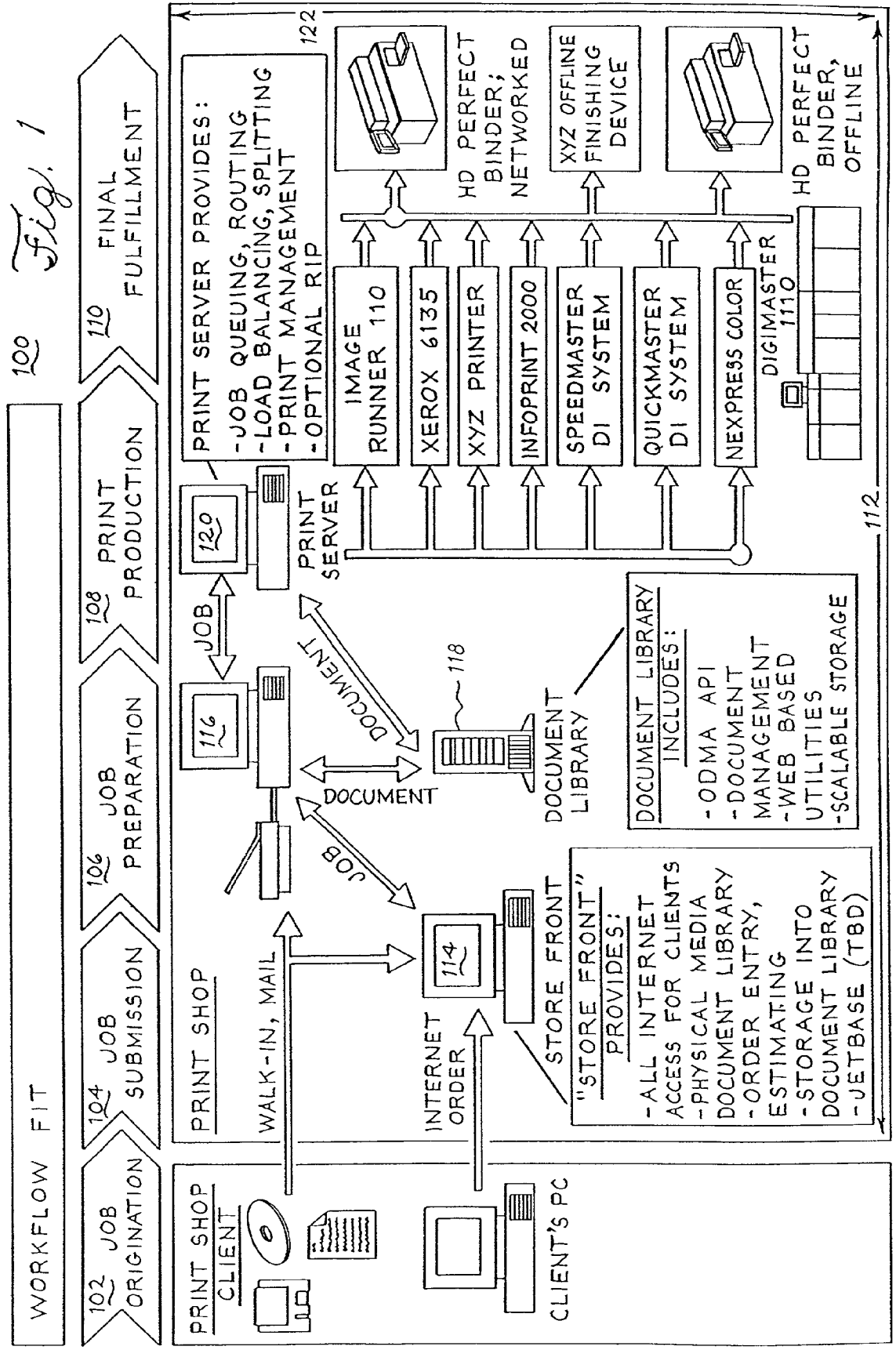
FIG. 1 depicts a flow diagram illustrating a preferred production printing workflow.

Referring now to FIG. 1, there is shown a flow diagram illustrating the production work flow 100 in a typical production print shop such as a commercial high volume copy or print shop. A workflow is defined as the tasks, procedural steps, organizations or people involved, required input and output information, and tools needed for each step in a business process. As will be discussed below, a workflow approach to analyzing and managing a business or process such as production printing can be combined with an object oriented approach, which tends to focus on the discrete objects and processes involved such as documents, pages, data and databases. For the purposes of this disclosure, the term "object oriented", when applied to the disclosed embodiments, does not imply that an object oriented programming approach is the only method of implementation of the disclosed embodiments.

FIG. 1 further depicts a typical computer network 112 for use in a print shop. In a typical digital print shop, there will be a network 112 of computer work stations 114, 116, servers 118, 120 and high volume output devices 122 which make up the computer network 112. The servers 118, 120 include network servers 118 and print servers 120. The topology of the network 112 is typically structured so as to align with the workflow 100 of the print shop. The network 112 may be implemented as a wired or wireless Ethernet network or other form or local area network. Further the network 112 may include wired or wireless connections to wide area networks such as the Internet and connections to other local area networks such as through a virtual private network.

The production workflow 100 includes the procedural stages of job origination 102, job submission 104, job preparation 106, print production 108 and final fulfillment 110. Alternatively, one or more of these procedural stages may be combined as well as there may be other additional procedural stages. Job origination 102 is the procedural stage of receiving the documents and instructions, which together are defined as a "job", from the customer. Job origination 102 can occur when a customer physically brings his job, whether in hard copy or electronic form, to the print shop or otherwise transmits the job to the print shop, whether by phone, fax, postal mail, electronic mail or over a local area or wide area network such as over the Internet. Note that a job may contain more than one document and more than one set of instructions. For example, a job may contain many documents, each being one chapter of a book, along with a document containing a cover for the book. This exemplary job may include the instructions for producing the body of the book from the individual chapter documents and another set of instructions for producing the cover. In addition, as will be discussed below, there may be a third set of instructions for assembling the cover to the body of the book.

Job submission 104 is the receipt of the job by the print shop and the entering of the job into the print shops production system or workflow. Typically the instructions from the customer will be written down on a special form, known as a "ticket" or "job ticket". A ticket may also be electronically created and maintained. Furthermore, pre-defined tickets may be available for standardized instructions. For example, the shop may have a pad of pre-printed tickets with the instructions to duplicate the documents, three hole punch the final output and assemble the punched final output in a three ring binder. If this is a common request by customers, such pre-printed tickets can save time and resources. All the order taking clerk need do is fill in any customer specific details such as the number of copies to produce. Pre-defined tickets may help to standardize operations and prevent errors in the transcription of instructions from the customer. In very simple print shops, job submission 104 may simply be the receiving of the original documents and instructions along with the creation of a ticket, placing the job in a paper folder and setting it in a physical queue for later handling in subsequent procedural stages.

In print shops which handle jobs electronically, job submission 104 requires entering the job into the shops electronic production system. For documents which are brought in by the customer as hard copy, the documents must first be scanned electronically into the shop's computer system. For documents delivered in electronic form, the document data files must be loaded on the shop's computer system.

For the job submission stage 104, the computer network 112 will include one or more "store front" workstations 114. The store front workstations 114 are computer systems placed at the order taking desk, at a manned clerk's station or set out for customer self service use. These workstations 114 are used for the job submission stage 104 and typically will be configured to handle many different electronic media types such as floppy disk, compact disc, tape, etc. These stations 114 may also be configured to receive jobs over the Internet or other form of network connection with customers. Further, these workstations 114 are typically configured to read many different electronic file formats such as those used by the Microsoft Office™ family of products manufactured by Microsoft Corporation, located in Redmond, Wash. or various other desktop publishing program file formats such as Aldus Pagemaker™ or QuarkXpress™. In addition, these stations 114 can also read "ready for printer" (also known as "print ready" or "page description language" ("PDL")) file formats, which will be discussed later, such as Portable Document Format™ ("PDF"), Postscript™ ("PS") or printer control language ("PCL"). Job preparation stations 114 can also accept image formats such as Tagged Image File Format ("TIFF"), bitmap ("BMP") and PCX. These stations 114 may also include a scanner for scanning hard copies of documents into the computer system. Scanners typically are complicated devices to operate and some print shops may prefer to locate the scanners in the job preparation stage 106 for use solely by trained personnel as will be discussed below. In addition, the store front computers 114 also provide the ability to generate a ticket, electronically or in hard copy form, for the job containing all of the instructions for completing the production printing task. This process of generating the ticket may be automated, involving pre-defined tickets, manual or a combination thereof, and is discussed in more detail below.

Job preparation 106 involves preparing the documents for printing according to the instructions in the ticket. For documents that are submitted in hard copy form, job preparation 106 may include scanning the documents and creating a faithful and error free electronic reproduction. The documents, once in electronic form, must also be distilled down/normalized i.e., converted into a common file format that the print shop can use to both edit and print the documents. This alleviates the need for operators to deal with multiple different programs and eliminates the need to assemble complex documents together for printing using different electronic file formats.

For example, a customer may bring in two different documents, one being the body of a book and the other being the photographs to be inserted at specific pages. The customer may then instruct that the photographs be inserted at particular pages and that the final assembly have continuous page numbers added. The body of the book may be in Microsoft Word™ format while the images of the photographs are in Adobe Photoshop™ format. While the operator could figure out at which pages the images will be inserted and appropriately number the pages of the book and photographs using each individual software package, this is a very complex and time consuming process. It also requires that the operator be trained and familiar with a range of software packages and runs the risk that he will not be familiar with the particular package that the customer used. Therefore, it is more efficient to distill each of the various file formats into a unified format which allows the operator to prepare the job using a single software interface. In the preferred embodiments, all documents, whether provided in hard copy or electronically, are distilled or converted into a "ready for printer" or "print ready" file format. In the preferred embodiments, the Portable Document Format™ is used as the ready for printer format, developed by Adobe Systems, Inc., located in San Jose, Calif.

A ready for printer file format is defined as a file format which contains both the data to be printed along with printer control instructions that can be directly interpreted by the internal processing engine of a printer or other form of hard copy output device in order to rasterize the data image onto the output media. Rasterization is the placement of image data at a specific location on the output media. Such file formats include Portable Document Format™ ("PDF") and Postscript™ ("PS") both manufactured by Adobe Systems, Inc., located in San Jose, Calif., as well as printer control language ("PCL"), manufactured by Hewlett Packard, located in Palo Alto, Calif. Examples of non-ready for printer formats include the native application file formats for personal computer application programs such as Microsoft Word™. These file formats must be first converted to a ready for printer file format before they can be printed. Furthermore, some image file formats, such as the Tagged Image File Format ("TIFF") contain bit image data only which is already in a format which specifies its output location on the output media and does not contain printer control instructions for interpretation by the internal processing engine of the printer and therefore, for the purposes of this disclosure, is not a ready for printer file format. By using a ready for printer format, rasterization of the image data can be delayed as close as possible to the final placement of the image data on the output media. This allows the most efficient use of the production print device 122 by allowing its internal control logic to optimize the rasterization process resulting in output that is more likely to match with the operator's expectations.

For the job preparation stage 106, the computer network 112 includes job preparation stations 116 and network servers 118 coupled with the store front workstations 114 over the network 112. Herein, the phrase "coupled with" is defined to mean directly connected to or indirectly connected with through one or more intermediate components. Such intermediate components may include both hardware and software based components. The job preparation stations 116 preferably execute workflow management software, described in more detail below, which allows the operator to manage, edit and print jobs. It will be appreciated that the functionality of the store front workstations 114 and the job preparation workstations 116 could be combined on one workstation which serves both purposes. The network server(s) 118 includes a document library which allows manipulation, management, storage and archiving of jobs, or just their respective documents and/or tickets, as well as facilitates and manages the flow of jobs from the store front computers 114 to the job preparation stations 116 and from the job preparation stations 116 to the print servers 120 or the production output devices 122. Exemplary document libraries include DocSmart™ document library manufactured by MosaicSoft, Inc., located in Laguna Hills, Calif. and Wipro Infotech, a division of Wipro, Ltd., located in Bangalore, India, Intra.DOc™ document management system manufactured by Intranet Solutions, Inc., located in Eden Prairie, Minn. and the DOCFusion document management system manufactured by Hummingbird, Inc., located in York, Ontario, Canada. In the preferred embodiment, the job preparation stations 116 are Imagesmart™ Workstations, manufactured by Heidelberg Digital, L.L.C., located in Rochester, N.Y. Alternatively, an appropriate computer hardware platform such as that comprising a Pentium™ class processor or better, manufactured by Intel Corporation, located in Santa Clara, Calif., 64 megabytes of RAM or more, a 20 gigabyte hard disk or larger and appropriate display device may be used. Further, in the preferred embodiment, the network servers 118 preferably comply with the Open Document Management Architecture ("ODMA") standard and provide document management capabilities and scaleable storage.

The job preparation workstations 116 also provide the capability of the print shop to add value to the print production process by offering services to the customer. Such services include the ability to modify documents provided by the customer to add features that the customer could not or would not add himself. Such features include adding page numbers across multiple documents, Bates numbering, adjusting page layout for tab stock and aligning the output to account for binding. Further the job preparation stations 114 provide the capability to fix errors in the documents such as removing artifacts in scanned images and masking over unwanted text or markings. The job preparation stations 114 can also be used to prevent inaccuracies in the finished output caused by the printing or binding process. Such inaccuracies include binder's creep which happens after a document is imposed into a booklet/pamphlet using a signature imposition. Binder's creep occurs when the placement of the images on the paper fails to account for the thickness of the binding as a function of the number of pages in the book causing the image on the pages to shift inward as you get closer to the cover. Binder's creep is prevented by shifting image slightly when performing the signature imposition on the document. In addition, the job preparation station 116 allows the operator to manage and layout the document pages for final output, also known as "imposition" and "signature imposition". In addition, the operator can shuffle pages, reverse pages, insert blank pages, trim and shift pages, create bleeds and place multiple pages on a sheet, also known as "n-up" to create proof sets, brochures or pamphlets, etc. Further the job preparation station 116 permits the operator to add annotations to the document such as Bates numbers, page numbers, logos and watermarks. All of these service add value to the final output. Formatting and other modifications to the document can be globally applied to the entire document, such as a shifted margin or may be applied only to select pages. Such alterations to the document are known as document/page features or attributes. Further, these alterations are also known as document or page exceptions since they typically override specific instances of the original document formatting as set by the customer. In one embodiment, page features also include embedded commands directed to the production output device 122 or its operator to cause certain actions or processes to take place. Such commands include instructing the device 122 or operator thereof to remove pages or documents (such as by directing them to a particular output exit or physically removing them) or load particular media such as ordered media (such as by using a particular paper supply or by physically loading the media) (see below), or commands which direct pages to a particular output exit.

The next stage in the print production workflow 100 is the print production stage 108. In the print production stage 108, the final form of the documents for printing is sent to a print server 120 which will distribute the job to the final output device 122. In manual print shops, this stage 108 would be similar to an operator manually taking the ready for production job over to the desired output device 122 to start the job. The print production stage 108 manages the output resources of the print shop. Such management includes queuing jobs to the proper devices 122 in the shop, routing jobs to available devices 122, balancing the load placed on the various devices 122, and pre-processing jobs, such as splitting or RIP'ing the job, prior to sending it to a particular device 122. RIP stands for Raster Image Processor and is the hardware and/or software which converts ready for printer data into raster images. It is also a common term for rasterizing a page image on to the output media.

The print server 120 used in the print production stage 108 is coupled with the job preparation stations 116 and the network server 118 over the network 112. Further, the print server 120 is coupled with the various output devices 122 in the print shop. Note that some output devices 122 may not support electronic transfer of the data to be output and may require a manual step for operation. Such devices may include a special binding machine which requires that the partially finished documents be manually transferred to the binding machine to complete the production. The print server 120 is preferably implemented as a separate computer coupled with the network 112, however, software based print servers running on a network server 118, job preparation station 116 or store front workstation 114 may also be used. In the preferred embodiment, the printer server 120 includes an independent computer workstation, typically running a UNIX or Windows NT operating system, a software print server engine and a software print server application. The print server application offers the user interface ability to configure and manage the print server operation. The print server engine performs the automated processes of the print server. These processes include spooling and queuing jobs and job content (i.e. the document), directing the jobs to specific production output devices based on the attributes of the print job and how these attributes are satisfied by the print engine, load balancing jobs among the various production output devices to keep all printers fully utilized, e.g. to split color from black and white jobs, and acting as a communication gateway where it can accept multiple input communication and print protocols translating them to the communication and print protocol the production output device 122 understands.

The final stage of the production printing workflow 100 is the final fulfillment stage 110. The final fulfillment stage 110 is the stage where the finished output is produced on the production output device 122. A production output device is a computer output device, such as a printer, designed for high volume production of printed documents. Such devices preferably include the ability to produce large quantities of documents with mixed media types and various degrees of finishing, such as stapling or binding, at very high speed. Exemplary output devices include the Digimaster™ Digital High Volume Printer manufactured by Heidelberg Digital, L.L.C., located in Rochester, N.Y. and the NexPress™ Color printer manufactured by NexPress, Corporation, located in Rochester, N.Y.

Figure 2:
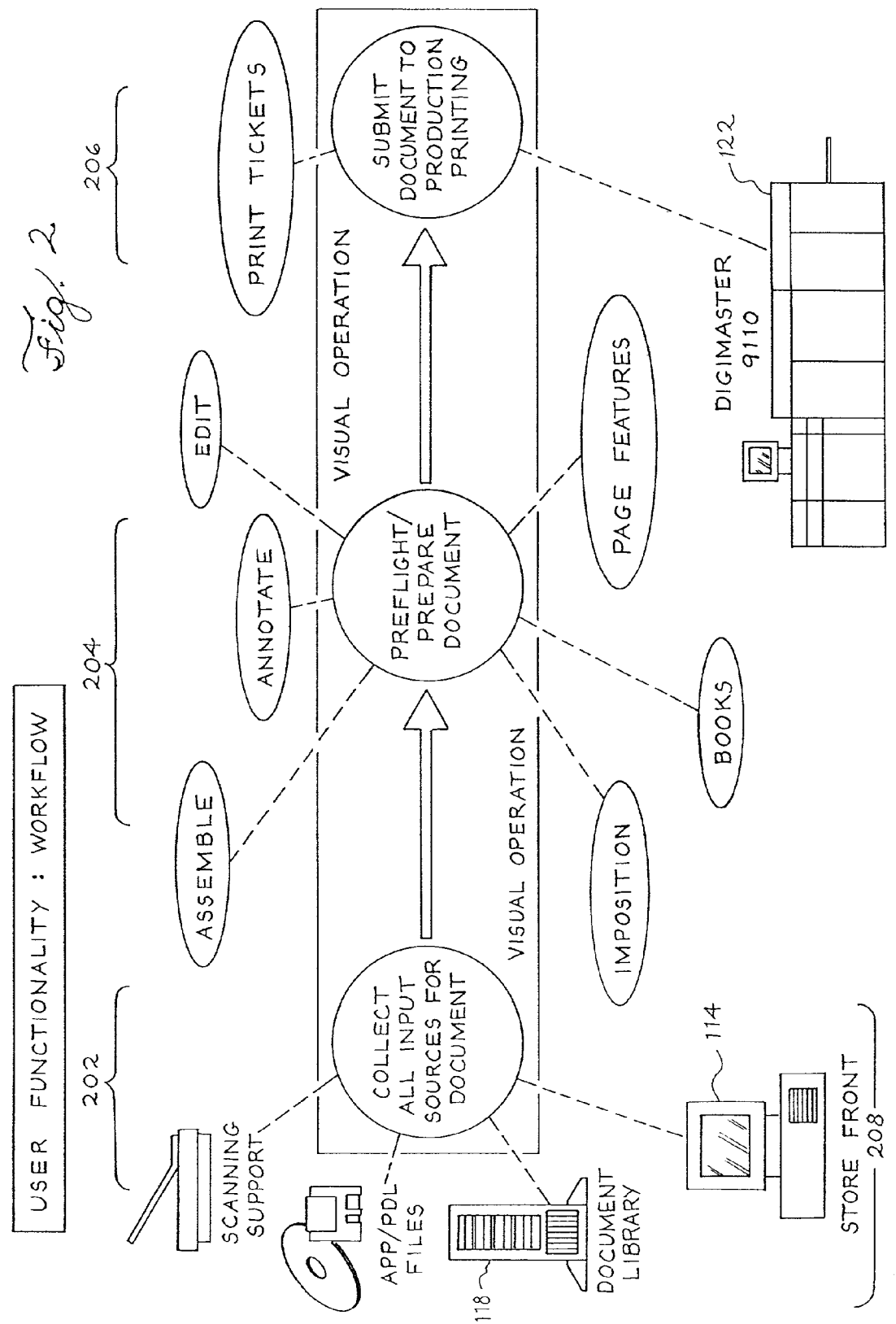
FIG. 2 depicts a flow diagram showing the user functionality workflow of the preferred embodiment

Referring now to FIG. 2, there is shown a flow diagram showing the user functionality workflow 200 of the preferred embodiment job submission and preparation stages 104, 106. The user workflow 200 includes an input source stage 202, a preflight stage 204 and a production stage 206. In the input source stage 202, all of the documents of the job are collected together from the different input sources 208. As detailed above, all of the collected documents are converted to a ready for printer format, preferably a Portable Document Format™. This conversion can be a manual or automated process or a combination thereof. For example, a special directory can be created on the network server 118 where data files in various file formats can be placed, for example, by the clerk who accepts the documents from the customer and inputs them into the store front workstation 114. Automated logic which watches this directory, will see the placement of files and automatically convert them (or flag them for manual conversion) into a ready for printer format. Any documents which the automated logic cannot handle can be flagged for manual conversion. The converted documents are then passed to preflight stage 204 where they are prepared for production. This transfer of converted documents can occur by moving the documents to a special directory on the network server 118 where they can be accessed by the job preparation stations 116 or by transmitting the documents to the job preparation station 116. This process can be manual or automated and may involve placing the documents in a queue of documents waiting to be prepared for production. Further, this process may include a manual or automated determination of the capabilities, skill level or training level of the various operators currently logged into the available job preparation stations 116 as well as the current load/backlog of jobs in their respective queues. Taking these factors into account, jobs can be automatically or manually routed to the operator best able to handle the job both technically and in an expedient manner. This functionality can be implemented by creating an operator database which tracks the capabilities, skill level and training level of the various operators who work in the print shop. This database can be coupled with queue management software which balances the loads/backlogs of jobs at each station 116.

In the preflight stage 204, the documents can be assembled, such as in a book, annotated, edited, and have imposition or other page features applied. Once the documents are prepared for production, they are passed to the production stage 206. In the production stage 206, the prepared documents along with the production instructions (from the tickets) are submitted to the print server or directly to the production output device 122 using a file downloader such as the Print File Downloader™ application program manufactured by Heidelberg Digital, L.L.C., located in Rochester, N.Y. This user functionality workflow 116 may be implemented as a combination of hardware, software and manually executed components and may involve one or more of the components detailed in the production printing workflow above.

In the preferred embodiments, the user functionality workflow is preferably implemented as a workflow management software program and interface executing on the job preparation workstation 116. The preferred workflow management software is visually oriented using an object oriented graphic user interface ("GUI") approach which integrates control of the workflow functionality in a single interface. While the visual and operational appearance of the management software is object oriented, the implementation of the software may be by an object oriented programming language or a non-object oriented programming language as are known in the art.

In the GUI interface, documents, tickets and other entities and operations (collectively "objects") are visually represented on the workstation 116 display, such as with icons, tree structures and pull-down menus, and may be interacted with using known devices and methods such as utilizing a mouse or track ball to control a visually represented pointing device which is then used to click, select, drag and drop the displayed representations. Such manipulation of the visual representations results in manipulation of the underlying objects (documents, tickets, and other entities and operations). Furthermore, the GUI also permits creation and manipulation of relationships and associations among the various objects and visually displays such relationships and associations. Relationships and associations may be displayed, for example, using a hierarchical approach like a tree structure or file folder structure or using some alternate form of visual indication. It will be appreciated that graphic user interfaces are well known in the art and that there are many software development packages available which can be used to develop a GUI. Such packages include the Open Software Development Kit and the Microsoft Foundation Class Library ("MFC"), both available from Microsoft Corporation, located in Redmond, Wash.

Further, the preferred GUI utilizes a document centric approach providing a centralized viewing window for viewing documents that are currently being worked on. In the preferred embodiment, the document viewing functionality is provided by the Adobe Acrobat software program, manufactured by Adobe Systems, Inc., located in San Jose, Calif.

As was noted above, the workflow management software integrates applications which implement, control or manage the stages of the production printing workflow 100. These applications include inputting documents from various sources, document assembly including the creation and manipulation of books, document editing, document annotation, document library access on the network server 118, setting and manipulation of page features, creation and manipulation of job tickets and printing.

The workflow management software is capable of receiving input from various different sources. Such sources include hard copy originals input via a scanner, native application formats such as the Microsoft Office™ Product suite and desktop publishing applications such as QuarkXpress™, manufactured by Quark. Inc., located in Denver, Colo. and FrameMaker™, manufactured by Adobe Systems, Inc., located in San Jose, Calif. Further the software can accept Tagged Image File Format ("TIFF") documents as well as documents already in a ready for printer format such as PDF, PS or PCL. For hard copy input via a scanner, the software supports industry standard scanner interfaces, TWAIN, as defined by the TWAIN group located in Boulder Creek, Calif. and the Image and Scanner Interface Specification ("ISIS") developed by Pixel Translations, Inc., located in San Jose, Calif. and also specified via American National Standards Institute specification ANSI/AIIM MS61-1996. Using these standard interfaces, the workflow management software receives the scanned image data directly in the ready for printer format. An exemplary scanner for use with the preferred workflow software is the Imagedirect™ Scanner manufactured by Heidelberg Digital, L.L.C., located in Rochester, N.Y.

The preferred workflow management software also provides ODMA support for interfacing with document libraries. In addition, the provided ODMA support further extends the functionality of the document library to handle management, storage and archiving of compound documents (described below) and tickets. This allows libraries of standardized tickets to be created or facilitates updates and reprints of compound documents such as books.

Once documents are loaded into the workflow management software, tools are provided to perform value added services and prepare the documents for production. Assembly is the process of arranging or rearranging pages or adding or removing pages within a document. Assembly also includes imposition where page positions are forced such as when the first page of a chapter is forced to the front side of the paper. The workflow management software provides cut, copy, paste and move functionality operable on 1 or more pages. This functionality is preferably implemented via pull-down menus, pop up dialog boxes or on screen option palates or buttons as provide by the graphic user interface. In addition, the results of the respective operations are shown in a visual representation of the document in the centralized document viewing window on the job preparation station 116 display.

The workflow management software further provides support for editing and annotating the document. Tools are provided for image object area editing of a scanned page including erase inside and outside an area, cut, move, copy and paste area as well as pencil erase. Page editing tools are also provided for editing on one or more pages including area masking and cropping. Tools are also provided for annotating documents including alpha-numeric and graphic annotations. Exemplary annotations include page numbering and Bates stamping. The tools further provide for placing images behind the document content, also known as watermarking. Annotation can be performed on any portion of one or more pages. For alpha-numeric annotations, the font size and style are controllable. In all cases, the results of the respective operations are shown in a visual representation of the document in the centralized document viewing window on the job preparation station 116 display. In the preferred embodiments, edits or annotations can be created or manipulated by pointing to a visual representation of the document and/or pages within the document and selecting, dragging, dropping or clicking the representation and/or selecting from a menu of options, where the selection of a particular option causes the associated edit or annotation to be applied to the specified portions of the document. Alternatively, a palate of options may be displayed from which the user may choose an option to apply to selected portions of the document. Further, the interface may provide for a dialog box or other visual control for inputting control values for the edit or annotation such as the starting number of a Bates range.

The workflow management software preferably provides further support for compound documents which are documents comprised of one or more other documents, such as books comprised of chapters or course packs comprised of one or more excerpted sources. Compound documents take advantage of the object oriented nature of the workflow management software. A compound document ("CD") is a collection of one or more documents which have a particular ordering to them such as the chapters of a book. The CD further contains an automatically generated assembled document which is a single document containing the whole assembled CD. Tools are provided which allow simple management of the documents of a CD, assembly and updating of the documents into the assembled document and selective document manipulation, such as selective printing, of the documents within the CD. Tools are also provided which can interpret the content of the documents within the CD and automatically generate a table of contents in the assembled document. A compound document otherwise acts just like a document and can be edited, annotated, etc. and have tickets associated with it. Further, a compound document can contain other compound documents such as in the case of a multi-volume book. The individual documents and compound documents within the compound document further retain their independent existence and can be edited or printed independently of the CD and shared with other CD's with those edits being either automatically or manually updated into the assembled document within a particular CD. The workflow management software further displays a visual representation, such as with a hierarchical or tree structure, showing the compound document and any associated documents and tickets. In the preferred embodiments, compound documents can be created or manipulated by pointing to the visual representations of one or more documents and/or a visual representation of a CD and selecting, dragging, dropping or clicking and/or selecting from a menu of options, where the selection of a particular option causes the associated feature to be applied to the selected documents or compound documents. Alternatively, a palate of options may be displayed from which the user may choose an option to apply to selected compound documents. Further, the interface may provide for a dialog box or other visual control for inputting control values for the compound documents such as margin values. For example, a user may select one or more documents and then choose a create CD option from a pull down menu. The workflow software then creates a visual representation of the CD on the display showing the association of the CD to the selected documents. Alternatively, the user may first create a visual representation of a CD and then drag and drop the visual representations of one or more documents onto the CD visual representation. The workflow software then creates the appropriate logical associations of the data for which the visual representations represent.

The workflow management software is also preferably programmed with data about the different production output devices 122 in the print shop or otherwise available and their capabilities or other equipment, such as finishing equipment, which can be utilized either automatically or manually. The software provides tools which allow the operator to set page features/formatting which are made possible by those specific capabilities. Such page features include the plex of the document such as duplex or simplex (double sided or single sided output), binding options, such as stapling or hole punching and the availability and control settings for handling tab stock or ordered media (see below). The preferred embodiments preferably support all of the features of the Digimaster™ line of high volume digital printers manufactured by Heidelberg Digital, L.L.C. located in Rochester, N.Y. In the preferred embodiments, these page features can be set by selecting or pointing to a visual representation of one or more pages and selecting from a menu of options, where the selection of a particular option causes the associated feature to be applied to the selected pages. Alternatively, a palate of options may be displayed from which the user may choose an option to apply to selected pages. Further, the interface may provide for a dialog box or other visual control for inputting control values for the feature such as the type of tab stock (see below). Setting page features for specific pages encodes instructions to the production output device 122 for implementing those features within the ready for printer formatted file. When the production output device 122 receives the file for printing, it will interpret those instructions to implement the desired feature. For page features which the current device 122 cannot handle, the device 122 can signal the operator that manual intervention is required and direct the operator through the appropriate steps to implement the page feature and complete the job. This may include instructing the operator to remove partially finished documents and transfer them to a binding machine for finishing or instructing the operator to load a specific media type or tab stock into the device 122.

Tools are further provided by the workflow management software to support electronic versions of tickets for specifying production output device instructions and parameters, as well as other finishing steps which may or may not be automated, which are global to the document, e.g. job level features or global document attributes. These include such attributes as the general media type or color to use and the method of binding such as stapling. Tickets, also referred to as print tickets or job tickets, can exist independently of documents or compound documents as was mentioned above. They are independently visually represented on the display by the workflow management software. Tools are provided for manipulating tickets, such as saving, storing and associating them with documents or compound documents in addition to editing their options. In the preferred embodiments, tickets can be manipulated just like documents, using pointing, clicking, selecting, dragging and dropping. For example, a ticket can be associated with a document by selecting the ticket and dragging and dropping it on a particular document. The workflow management software then preferably visually displays the association by showing the ticket under the hierarchy of the document. Once associated, the options set by the ticket will apply to the associated document or compound document. The options represented by the ticket may be set by selecting the ticket to bring up a dialog box or pull down option menu which displays the available options and allows modification of the option values. Tickets associated with documents can be manipulated with the document. For example, saving a document saves all of its associated tickets. Furthermore, the workflow management software provides the capabilities to create libraries of standardized tickets which can be used, for example, to standardize procedures across multiple franchised print shops.

Finally, the workflow management software provides tools to send the prepared documents and any associated tickets to the production output device for final production. In the preferred embodiments, documents or compound documents can be sent to a production output device by selecting, clicking or dragging the visual representation of the document or compound document to a visual representation of the print server or output device. Alternatively, the user may select an appropriate option from a pull-down menu, pop up dialog box or button palate. The workflow management software supports standard interfaces and protocols to production output devices and print servers. Further, tools are provided for managing, selecting and monitoring multiple production output devices. These tools provide visual feed back of each of the devices status to the user such as the status of the current job queues.

Figure 3:
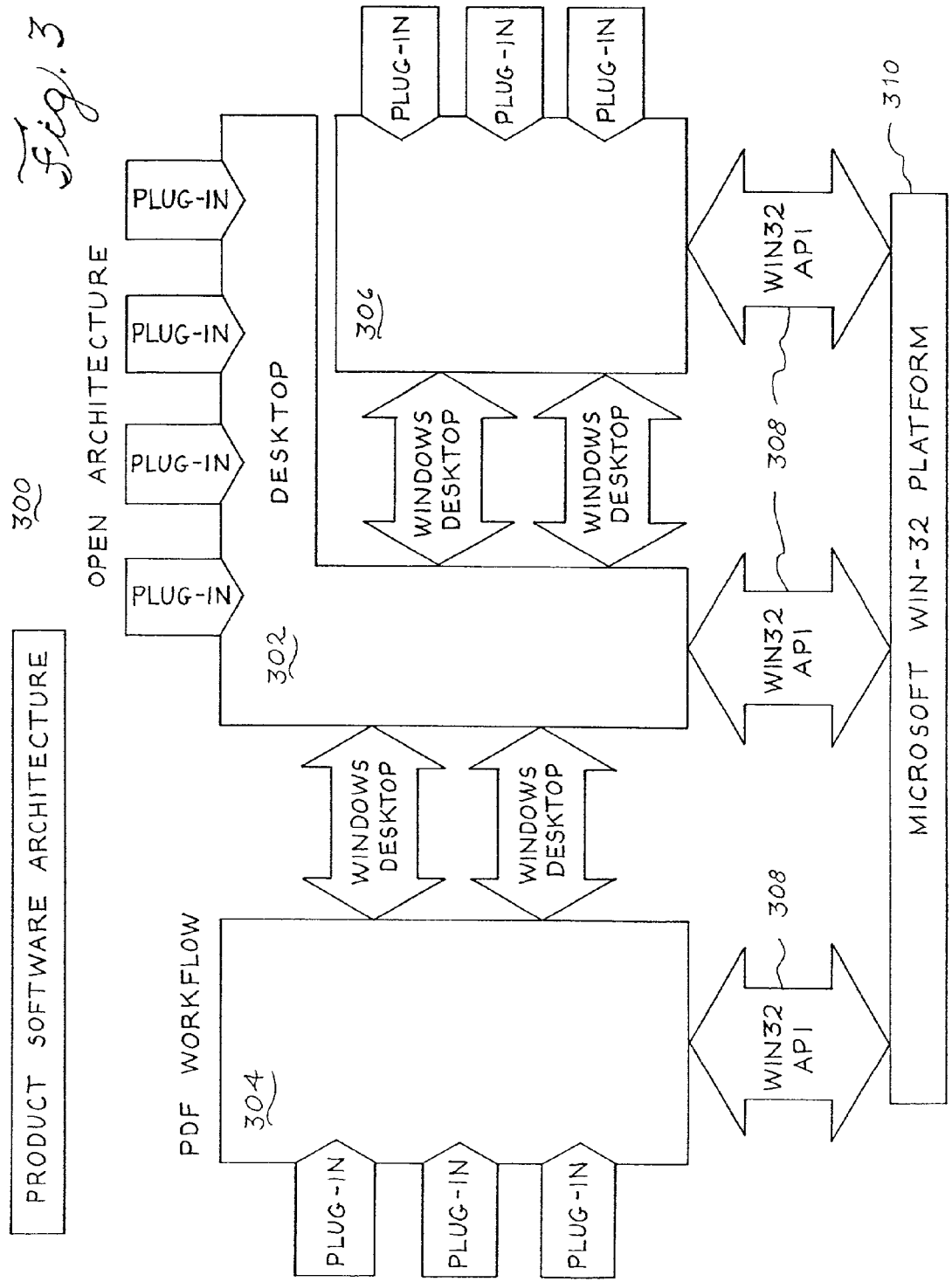
FIG. 3 depicts a block diagram of a preferred software architecture for use with the embodiments shown in FIGS. 1 and 2.

Referring now to FIG. 3, there is depicted a block diagram of a preferred software architecture 300 of a production printing workflow management application. The architecture 300 includes a desktop component 302, a workflow component 304 and a viewer component 306. All of the components execute via application program interfaces 308 on a the job preparation station 116 which is, as discussed above, preferably a 32 bit Microsoft Windows™ (95, 98, 2000, etc.) or Windows NT™ based platform 310.

Central to the architecture 300 is the desktop component 302 ("desktop"). The desktop 302 integrates the viewer 306 and workflow 304 components together. The desktop 302 implements the integrated GUI interface and provides all of the workflow functionality and visual representations described above to be displayed on the job preparation station 116 display. The desktop 302 is preferably structured as a plug in architecture. A plug in architecture allows enhancements and updates to be incorporated into the desktop in a simple and efficient manner and without requiring recompilation of the main program code which implements the desktop. The main program code is designed to look for small enhancement programs ("plug ins") each time the code is executed. If one or more plug ins are found, their functionality is incorporated into the main program code through a plug in interface. A plug in may contain a new feature or function or may modify an existing feature or function. By not requiring recompilations, enhancements can be distributed to users who can easily update their own software simply by placing the plug in the correct location on their computer system. From the user's perspective, upon loading of the desktop 302, a complete desktop 302 containing both old and new functionality is seamlessly presented. In the preferred embodiments, the desktop 302 is preferably implemented using an object oriented programming language which implements the object oriented nature of the GUI. Such languages include C++ or Java and may utilize Microsoft Corporations Open Software Development Kit or MFC library. Alternatively, a non-object oriented programming language may also be used.

The viewer component 306 ("viewer") provides the functionality for viewing documents and pages within documents and preferably operates on documents formatted in a ready for printer format. Further the viewer 306 provides the ability to assemble, edit and annotate at the page level of the document as well as set page features for individual or groups of pages. In the preferred embodiment, the viewer component is implemented using the Adobe Acrobat™ version 4.05 manufactured by Adobe Systems, Inc. located in San Jose, Calif., which utilizes the Portable Document Format™ ready for printer format. The viewer is coupled with desktop via standard Microsoft Windows interfaces and the Acrobat application program interface, as defined in the Adobe Acrobat Software Development Kit available from Adobe Systems in San Jose Calif. The viewer 306 is also preferably implemented as a plug in architecture which allows additional enhancements to be added. Such additional enhancement plug ins may be used to add one or more of the page level assembly, editing and annotation functions described above. Such plug-ins include Quite Imposing Plus™ manufactured by Quite, Inc., located in London, United Kingdom for performing the various imposition functions disclosed above and StampPDF™ manufactured by Digital Applications, Inc., located in Lansdowne, Pa. for performing various annotation functions disclosed above. Alternatively, viewers 306 which utilize non-ready for printer formats, such as TIFF formats can also be used. However, such viewers 306 typically have reduced feature sets and limited ability to perform assembly such as imposition, editing or annotation functions due to the fixed nature of the TIFF data format.

The viewer 306 is coupled with the desktop 308 via a viewer application program interface ("API") so as to provide interoperability of functions and facilitate the workflow. In particular, the desktop 302 visually represents objects which the viewer 306 may be displaying Further, the user selection and manipulation of documents, tickets or other objects in the desktop 302 are appropriately transmitted to the viewer 306 for display. For example, when a user selects a document on the desktop 302 for viewing, information about the selection is passed to the viewer 306 so that the selected document can be loaded and displayed. In one embodiment, the desktop 302 also provides for data transfer between documents displayed in the viewer 306. For example, where a user selects a page from a document in the viewer 306, copies that page and then selects another document from the desktop 302 to paste the copied page into. The desktop 302 facilitates this "clip board" functionality between the documents. In an alternate embodiment, the ability to copy or move portions of one document to another is provided by the viewer 306. Further, edits, annotations or the addition of other page features using the functionality of the viewer 306 may cause data to be passed to the desktop 302 so that these edits, annotations or additional page features can be visually represented and noted with the documents they apply to. For example, addition of a page feature to a document, such as setting the plex, may cause a page object, i.e., a visual representation of the existence of a page feature, to be created and associated with the document object, i.e., the visual representation of the document on the desktop 302. The association may appear as a hierarchical structure on the desktop 302 such as a tree structure.

The workflow component 304 is also coupled with the desktop 302 via workflow API. The workflow component 304 provides tools and functionality for managing the production printing workflow of particular documents or compound documents. The workflow component 304 provides for creation and/or definition of a workflow object which can be visually represented on the desktop 302 and manipulated using the desktop 302 functionality, as described above, just like other objects such as documents, compound documents or tickets. The workflow object can be defined to contain the procedural stages that a document must go through to be finally produced. When the workflow object is associated with a document or compound document, such as by drag and drop using the GUI of the desktop 302, each of the defined procedural stages is then performed. For example, one of the procedural stages could be the creation of a ticket. If a document that has no ticket is dropped on this workflow object, the operator is then guided through the creation and association of a ticket for the document. Workflow objects can be defined to guide an operator through or automatically perform a series of procedural steps. They can be used to standardize and automate routine procedures in the print shop and eliminate inconsistencies and inefficiencies in the production printing workflow. Workflow objects can exist independently of documents, compound documents or tickets or can be associated with them. Such associations can be visually represented in the hierarchical format as described above.

The workflow component 304 is preferably also implemented as a plug-in architecture to facilitate enhancements. One exemplary workflow component 304 which can be used with the disclosed embodiments is the Adobe Capture™ program version 3.0 manufactured by Adobe Systems, Inc. located in San Jose, Calif. In an alternative embodiment, the workflow component 304 is a standalone workflow management interface, providing its own graphic user interface for managing and manipulating workflow objects and their relationships with documents, compound documents and tickets.

Figure 4:
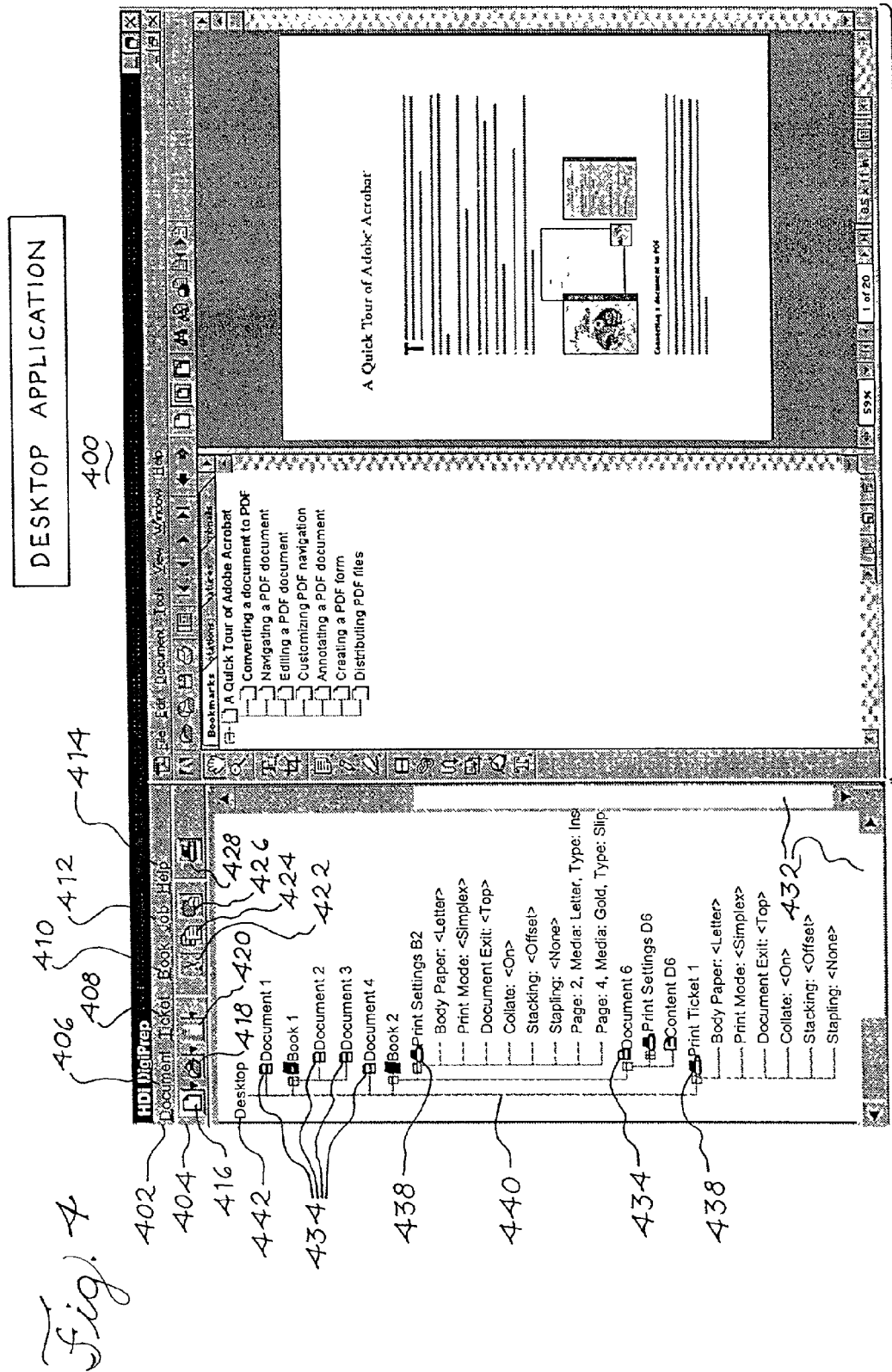
FIG. 4 depicts a representation of a graphic user interface display according to the preferred embodiment.

Referring now to FIG. 4, there is shown a representation of a graphic user interface display 400 according to the preferred embodiment. The display 400 includes viewer 306 and desktop 302 components. The desktop component 302 includes menus 402 and button palates 404 which allow the user to visually manage and manipulate the various objects described above. The menus 402 include a document menu 406, a ticket menu 408, a book menu 410, a job menu 412 and help menu 414. The button palate 404 includes a new object button 416, an open button 418 and a library access button 420. The button palate 404 further includes a cut button 422, a copy button 424, a paste button 426 and a print button 428. It will be appreciated that graphic user interfaces are well known in the art and there are many ways to implement a GUI and therefore, all forms of graphic input devices, including tear off menus, floating button palates, dialog boxes, alternate keyboard command and mouse short shortcuts and alternative physical input devices are all contemplated.

The document menu 406 provides options for creating and manipulating document objects within the workflow software environment. Such options may include creating a document, opening a document, closing a document, opening an ODMA interface to a document library, viewing a document in the viewer component, moving a document, printing a document and deleting a document. The ticket menu 408 provides options for creating and manipulating job/print tickets. Such options may include creating a ticket, accessing a database of tickets, viewing and setting the features/attributes controlled by a ticket, moving a ticket, deleting a ticket and associating a ticket with a document or book. The book menu 410 provides options for creating and manipulating compound document objects. Such options may include creating a book, associating or disassociating documents with a book, associating or disassociating a ticket with a book or document within a book, generating the assembled document from all of the associated component documents, generating a table of contents for the book, updating the assembled document with updates made to individual component documents, printing a book or selectively printing subsections of a book. The job menu 412 provides options for creating and manipulating jobs which, as noted above, are documents or compound documents and associated job/print tickets. Such options may include creating a job, editing a job, moving a job, printing a job and deleting a job. The help menu 414 provides options for assisting the user with operation of the software.

The new object button 416 implements functionality to create a new document, ticket, compound document or job object and preferably, selection of this button causes a dialog box presenting various related options to be presented to the user. The open button 418 implements functionality to open an existing document, compound document, ticket, job or document library and preferably, selection of this button causes a dialog box to be presented which allows the user to locate files and manage the file system of the job preparation station 116 or network server 118. The cut button 422, copy button 424, and paste button 426 implement functionality for moving and duplicating selected objects visually displayed by the desktop 302 as is known in the art. These buttons are coupled with a temporary storage area, also known as "clipboard" through which the cut, copy and paste functionality is implemented. The print button 428 implements the functionality of sending selected document or compound documents to the production printer device. This button preferably causes a dialog box to be displayed to the user which acts as the interface between the desktop 302 and the print server 120 and production output devices 122. This interface may allow last minute overrides to the output options prior to final production. Preferably, this button invokes the Print File Downloader™ application manufactured by Heidelberg Digital, L.L.C., located in Rochester, N.Y. It will be appreciated that options and functions can be implemented either as a button or menu option and that the preferred workflow software can work with any arrangement. It is preferred, however, that any arrangement of buttons, menus, etc. be arranged in an ergonomic and intuitive arrangement which minimizes the operator's training time and reduces the opportunities for operator error.

The desktop component 302 further includes a hierarchical display window 430. FIG. 4 further shows an exemplary hierarchical display window 430 showing a representative collection of objects and associations. This window 430 includes standard windowing control as are known in the art such as scroll bars 432. The window 430 further includes a representation of a hierarchy under which all of the represented objects are arranged. The exemplary window 430 includes a desktop object 442 representing the underlying database of objects, document objects 434, book objects 436 and ticket objects 438 all associated in tree structure 440. The tree structure represents the logical underlying associations between the data which the objects 434, 436 and 438 represent. For example, the book object 436 labeled "Book 1" contains document objects 434 labeled "document 2" and "document 3". The book object 436 labeled "Book 2" contains a ticket object 438 labeled "print settings B2" and a document object 434 labeled "Document 6" which itself contains a ticket object 438 labeled "print settings D6". Further, the document 434 labeled "Document 1" is not associated with any other objects. In addition, objects can be "expanded" or "collapsed" to show or hide their attributes or other objects lower in their hierarchy. For example, page objects representing page features specified for selected pages within a document can appear underneath the hierarchy of the specific document to visually indicate their existence to the operator. Selecting the page object permits the operator to edit, view or otherwise manipulate that page feature. A page object can exist for each page feature specified for a given document.

Figure 5:
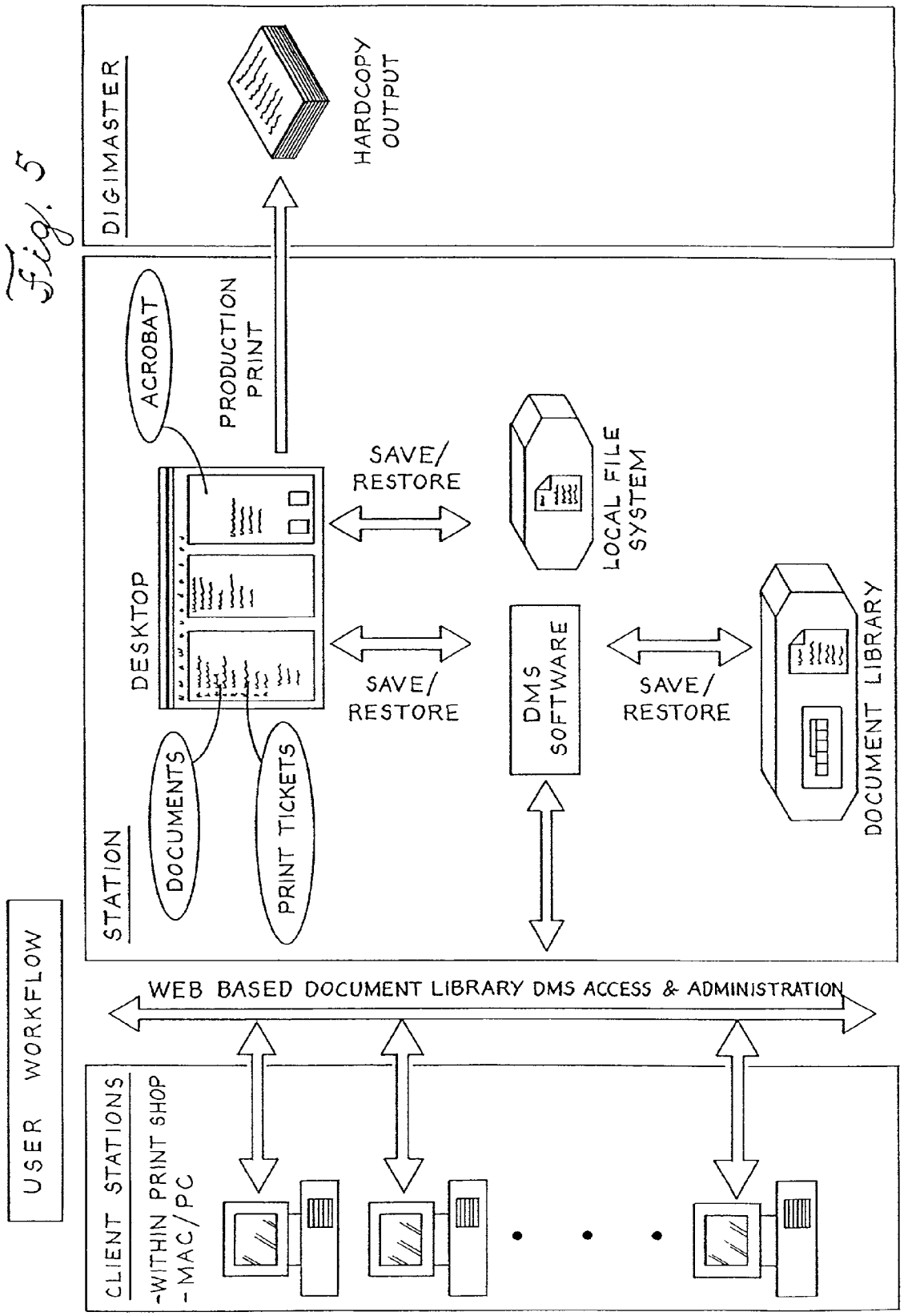
FIG. 5 depicts a high level representation of the integration of the preferred embodiment in the workflow of the print shop.
Figure 6:
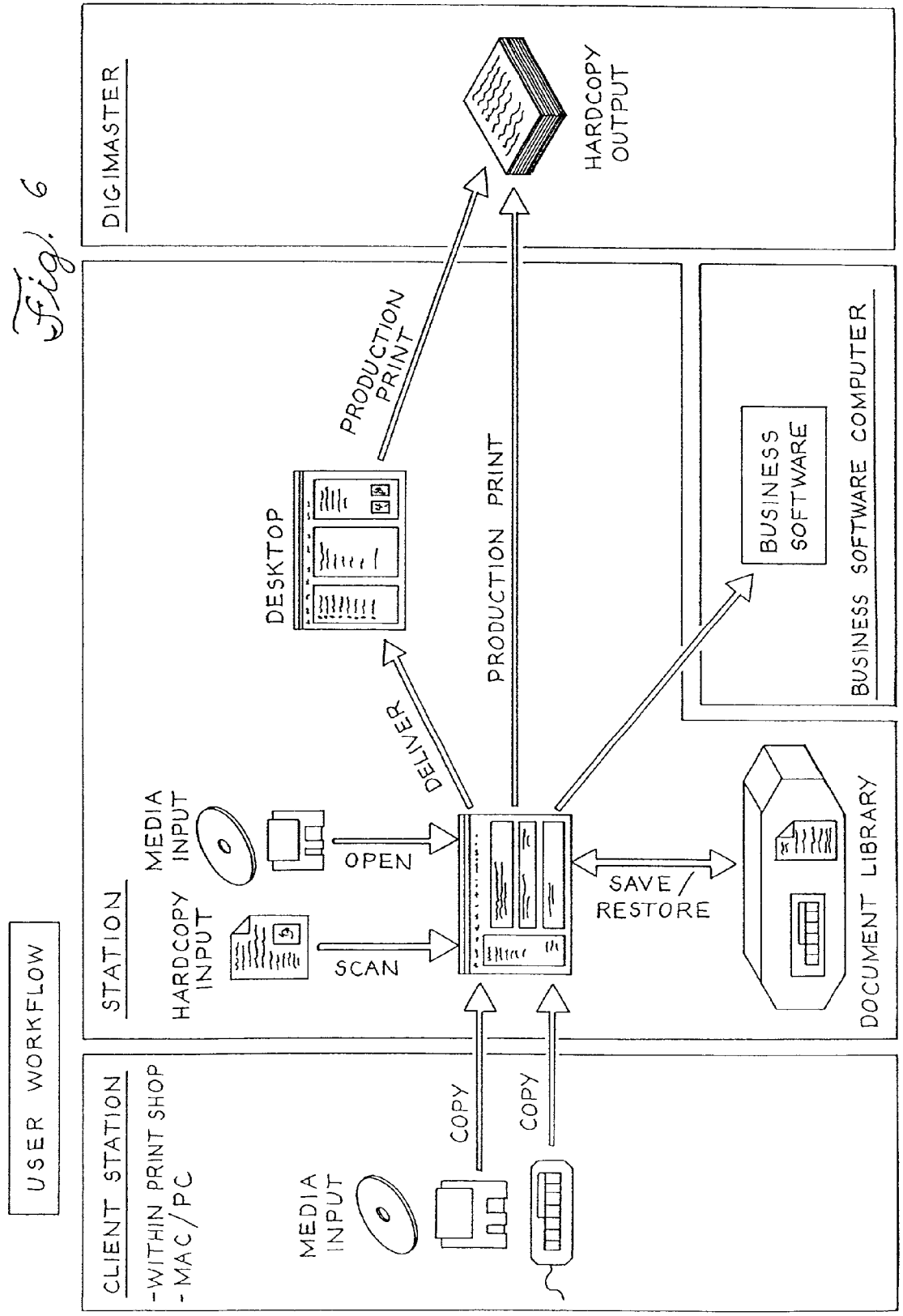
FIG. 6 depicts a high level representation of the integration of the preferred embodiment in the workflow of the print shop including a workflow automation component.

The display window 430 provide an intuitive and visual representation of the work that has to be managed and completed on the particular job preparation station 116. The operator can manage and prepare multiple different documents or jobs and keep everything organized in a simple and efficient manner. FIG. 5 shows a high level representation of the integration of the workflow management software described above in the workflow of the print shop. FIG. 6 shows an alternative high level representation of the integration of the workflow management software in the workflow of the print shop including the workflow component 304 for automating and standardizing the procedural steps within the workflow.

In alternative embodiments, or in addition to and as an extension of the above disclosed functionality, other features can also be provided such as page tickets, mobile page features, visual page features, and efficient use of production output resources. Page tickets are similar to job tickets except that they contain one or more page objects, each of which holds a particular page feature or attribute and the settings for that feature or attribute. The page ticket acts like a portable container for various page formatting features and attributes, which are described in more detail above. The page ticket provides a convenient and efficient method of applying one or more page features to a page or range of pages in a document. The printing workflow management software provides functionality for visually representing page tickets on the desktop 302 just like other objects and provides for creating, manipulating and associating page tickets, documents or compound documents. In a preferred embodiment, an operator can apply the page features contained within a page ticket by simply dragging and dropping the page ticket from the desktop 302 to a selected page or range of pages in the viewer 306. This action causes all of the page features within the page ticket and their respective settings to be applied to the selected pages. For example, a page ticket can be defined which sets or adjusts a left margin for binding purposes, sets the color of the paper to be used to blue, and defines that the page is to be three hole punched. Instead of having to define each of these features individually for the desired pages, they can be defined once in a page ticket and then dropped on the selected pages. This allows creation of page ticket libraries which contain a standardized page tickets, each containing combinations of page features that are commonly used. In the preferred embodiments, dropping the page ticket on a document or CD will cause creation of page objects representing the respective page features to be created in that document's or CD's hierarchy in addition to the actual application of those features to the pages of the document or CD as described above. It will be appreciated that the functionality of page tickets can exist and be implemented independently of an object oriented user interface.

In another alternative embodiment, mobile page features are implemented. Typically, a page feature is associated with a particular page number in a document and not associated with the page itself. If the page is copied to another location in the same or a different document, the defined page features may not follow. By implementing mobile page features, the page features stick to the page and follow it where ever it goes. Mobile page features are implemented by embedding them within an unused portion of the ready for printer format code. Preferably this is done using an extensible markup language ("XML") as defined in the XML 1.0 Specification produced by the W3C XML Working Group, REC-XML-0210. In the preferred embodiment, while the page features are actually separate from the document itself, they are still independently visually represented on the desktop 302 as page objects within the particular document's hierarchy so as to provide an intuitive indication of that feature's existence as well as intuitive access to the feature or editing and manipulation. It will be appreciated, however, that the functionality of mobile page features can be implemented independently of an object oriented user interface.

In yet another alternative embodiment, the application of particular page features or document features are visually represented in the viewer 306. For example, application of a page feature for three hole punching would cause visual representations of the holes in the pages to appear on the visual representation of the selected pages. This would allow the operator to see the results of the page feature and determine, for example, if the body text of the page is too close to the holes. While the page or document features are visible in the viewer, they are inserted in the ready for printer format code so as not to actually print out when the document is sent to the production output device. Preferably, the logic which implements the visual representation of the page and document features knows of the capabilities and operations of the selected production output device. For example, the logic knows that the automatic stapler in one production output device staples along the left edge of the paper while another production output device staples along the top edge. The logic then knows, for a particular selected production output device, where to display the staple when the user applies a stapling page feature.

Visual representation of page features is especially useful when a document involves tabbed separator pages or other types of ordered media inserts. When page features defining the insertion of tab separator pages or other ordered media and their attributes are applied to the document, the operator is able to see in the viewer 306, a visual representation of the inserted ordered media within the document along with any attributes of that media. For example, an operator may see a visual representation of a tab separator page within the document. The visual representation may also display attributes of that separator page such as the position and size of the tab cut and any printing/content or labeling appearing on either side of the separator page or the tab cut. Other attributes may also be displayed such as ordering information which indicates to the operator where a particular insertion of ordered media fits into the document in relation to other ordered media inserted in the document. For example, the display may indicate that the particular tab separator page is the third separator page inserted in the document. This would allow the operator to ensure that the tab cuts are positioned appropriately among the inserted separator pages (see below for more detail) and that the tab labels are correct.

Specifically, tab stock or other ordered media inserts introduce additional complexities into the production workflow. These complexities arise from the nature of ordered media and the disconnected nature of the operator who prepares the job at the job preparation station 116 and operator who operates the production output device 122 and loads the required media into the device 122. Specifically, ordered media refers to media that is separately created by (such as on a separate output device, e.g. a color printer), arrives at or is ordered by the print shop in a specific configuration and with specific details which require special handling, such as particular orientation and location within a document. As will be described below, this includes media, such as pre-cut tab media or pre-printed media, which has a particular ordering relationship, such as a sequence, requiring ordered insertion into a document. Generic media, such as blank paper or blank card stock does not typically require such special handling.

Figure 7:
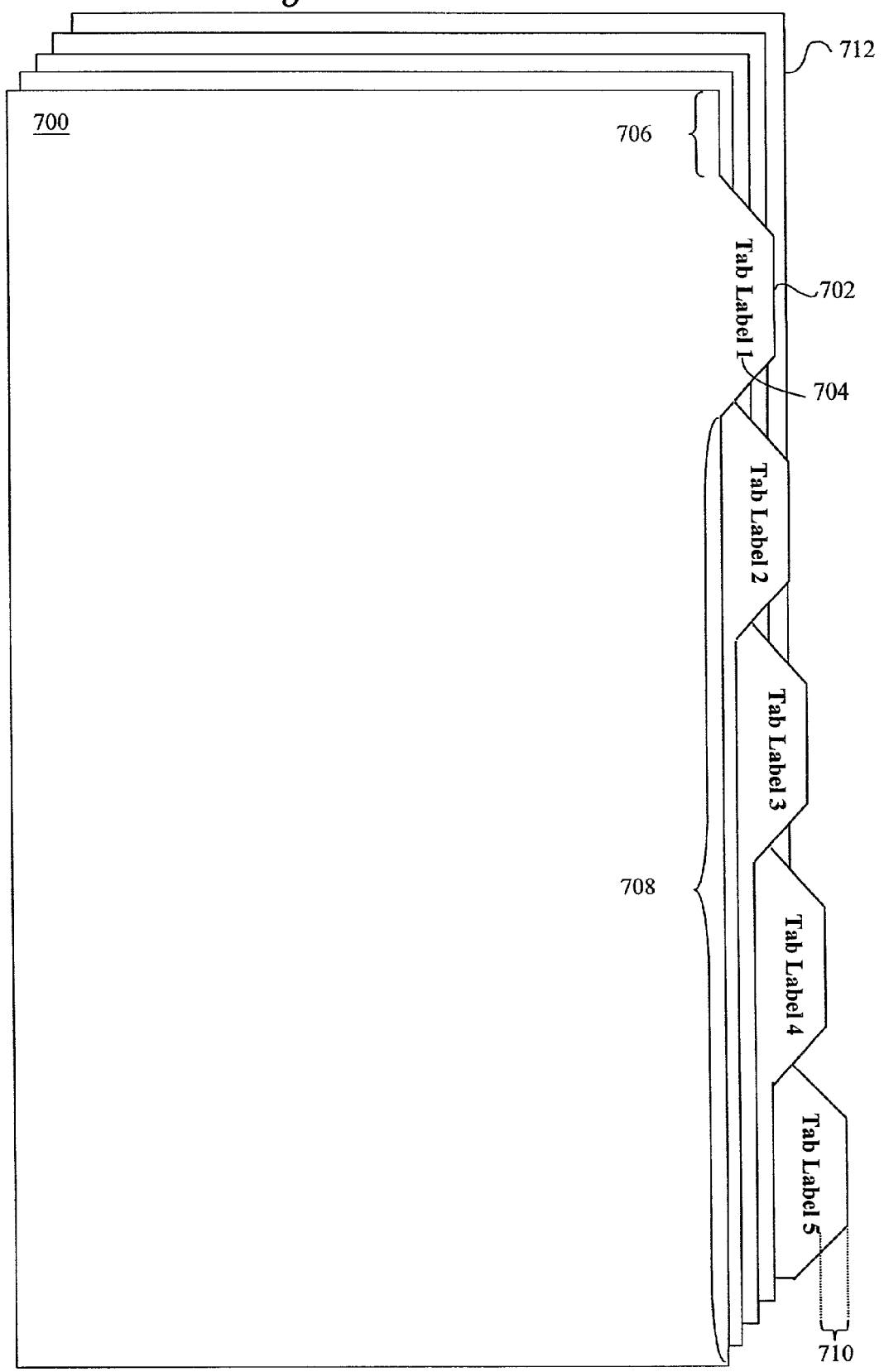
FIG. 7 depicts an exemplary tab separator page set for use with the preferred embodiment.

FIG. 7 depicts a typical tab separator page 700. The tab separator page 700 is typically the same size or substantially the same size as the other media types used in the document with the addition of a tab cut 702 extending from one edge of the page 700, typically, the edge opposite the bound edge of the document, although the top or bottom edges may also be used. The tab cut 702 extends beyond the edge of the other pages of the document so as to provide a visual indicator of the location of some portion of the document, such as the beginning of a section or chapter, or the location of an appendix. The position of the tab cut 702 is defined by the tab cut left indent 706 and the tab cut right indent 708. When viewing the tab separator page 700 with the bound edge on the left hand side and the tab cut 702 extending from the right hand side, the tab cut left indent 706 defines the distance from the top edge of the separator page 700 to the top edge of the tab cut 702 and the tab cut right indent 708 defines the distance from the bottom edge of the separator page 700 to the bottom edge of the tab cut 702. The sum of the tab cut right and left indents 706, 708 plus the width of the tab cut 702 equals the width of the page 700. In an alternative embodiment, the tab cut left and right indents 706, 708 define the distance from their respective edges to the usable/printable area of the tab cut 702, thereby preventing printing on the chamfer or radius area of the tab cut 702.

Where multiple tab separator pages 700 are used, it is desirable that the sequential tab cuts 702 not directly overlap to further allow a reader to spot each tab separator page 700 and quickly identify the indicated section of the document. Tab separator pages 700 are therefore supplied to the print shop in ordered sets 712. A tab set 712 typically includes five (as shown in the figure) or eight (not shown) ordered/sequential tab separator pages 700, each with a different non-overlapping tab cut 702 position. It will be appreciated that the number of tab separator pages 700 within a tab set may be greater than or less than five or eight. Further, a production output device 122 may include the capability to produce tab separator pages 700 from blank stock using a cutting or punching apparatus. Within each tab set 712, subsequent tab separator pages 700 differ in the position of the tab cut 702, i.e. the tab left indent 706 and the tab right indent 708 are incrementally adjusted for each tab separator page 700. Where the document includes more tab separator pages 700 than are included in a single tab set 712, more than one tab set 712 may be used. In this way, the tab cut 702 of one particular tab separator page 700 will overlap only every fifth or eighth tab cut 702 (depending on the number of tab cuts 702 in a set 712) of the remaining tab separator pages 700, creating an easily accessible and manageable document.

However, problems can occur when a document uses less than a full tab set 712 (or multiples thereof). It is desirable that each copy of a document produced have tab separator pages 700 with their tab cuts 702 in identical positions within the document, from copy to copy. Typically, this means that the first tab separator page 700 should have its tab cut 702 in the top most position (i.e. the lowest left tab cut indent 706). In the case of a document that does not require a full tab set 712, or multiple thereof, the remaining tab separator pages 700 of that incompletely used set 712 would have to be discarded and a new set 712 loaded before the next copy of the document could be produced. Therefore, the operator of the job preparation station 116 and the operator of the production output device 122 need to coordinate on the size of the tab set 712 to use for the particular job so as to make the most efficient use of the tab separator pages 700. Further, information about the tab separator pages 700 included in the document has to be made available to the production output device 122 so that it (or the operator) knows when to insert the tab separator page 700, as these pages 700 are typically stored in an alternate media store within the device 122.

Alternatively, tab separator pages 700 may be pre-printed with ordered information such as chapter or section numbers. These pre-printed tab separator pages 700 must then be inserted into the document at the proper locations by the production output device 122 or its operator. All of the tab separator pages 700 for a single document may be supplied to the print shop as a set 712 with one set provided for each copy of the document to be produced. It will be appreciated, that other pre-printed media may be supplied with ordered information already printed on it. As used herein, ordered media refers to any media having a unique or inherent order or sequence to it requiring ordered/sequential insertion into another document or production through the production output device 122. It will be appreciated that the disclosed embodiments contemplate any ordered media and are not limited to tab separator pages 700.

In addition, tab separator pages 700 and their tab cuts 702 can have labels 704 or other information, collectively referred to as "tab labels," printed on them during the printing process, just like any other page in the document. This requires coordination between the operator of the job preparation station 116 and the operator of the production output device 122 to coordinate which type of tab sets 712 will be used. In order to position tab labels 704 properly, the operator of the job preparation station 116 needs to know what kind of tab stock the document will be printed on so that the positions and sizes of the tab cuts 702 are known allowing the labels to be properly positioned/aligned, such as centered, and formatted. In the current embodiment, the operator of the job preparation station 116 specifies the type of tab set 712 (or other ordered media) to use so that the viewer 306 can visually represent any inserted tab separator pages 700 as they will appear when output by the production output device 122, including the size and position of the tab cuts 702. The type of tab set 712 to load is encoded within the document. When the document is submitted to the production output device 122 to be produced, the device 122 determines the type of tab set 712 that needs to be loaded and notifies the operator to load the proper media and/or commands the device 122 to use media from a particular supply source within the device 122.

Alternatively, the operator of the job preparation station 116 may not know which tab sets 712 are on hand in the print shop. In this case, the operator specifies the insertion of tab separator pages 700 or other ordered media, the order of insertion and specifies any tab cut labeling, formatting, such as orientation, e.g. portrait or landscape, font and style, or other attributes and relative positioning of the labels. However, the operator does not specify the type of tab set 712 to use or the absolute label position. When the job is submitted to the production output device 122, the production output device 122 or its operator dynamically determines the type of tab sets 712 that are on hand and instructs the production output device 122 to fit the specified tab separator pages 700 to the available tab sets 712. The production output device 122 then automatically figures out the placement of tab labels 704 on the tab cuts 702 for each tab separator page 700. In this way, the operator of the production output device 122 can make the most efficient decision on which type of tab set 712 to use at the time of production without impeding the job preparation station 116 operator. For more detail, refer to U.S. patent application Ser. No. 09/803,387, "SYSTEM AND METHOD FOR VISUAL REPRESENTATION AND MANIPULATION OF TABS ON A PRODUCTION PRINTER", filed concurrently herewith. This functionality further offers the advantage of simpler document management. The operator of the job preparation station 116 need only associate tab labels and their attributes with the pages where they are to be inserted. If those pages are moved around the document, or otherwise the order is altered, the tab labels will follow appropriately. For example, a document may contain an index section, the first page of which also contains a bleed tab. That index section may be subsequently moved behind another tabbed section or deleted altogether, necessitating a change in the tab label positions of one or more of the tab separator pages in the document. When the document is ultimately printed, as described above, the tab labels will be appropriately positioned and output. This applies to bleed tabs created on regular media as well. In this case, the bleed tab label will move with its associated page and the position will be appropriately adjusted relative to all of the other tab labels at the time of printing.

To implement the dynamic capability described above the tab information (label and attributes, including plex and relative positional information) is stored with the document data file (in the preferred embodiment, within the PDF file as a private tag) so that it can be retrieved and properly placed when printed. The information is stored so that it can be identified as tab information, retrieved from the document, removed or repositioned or otherwise modified to accommodate changes to the type of tab stock used or changes in relative positioning within the document. At the time the tab is actually created, the tab label size, horizontal and vertical positions, rotation and which page edge to place it on are determined.

As described above, the workflow management software provides the capability, built in or via a plug-in, to set page features for the various pages in the document. In the case of tab separator pages 700 or other ordered media, the software provides the capability to set the various attributes or parameters of the ordered media. This capability may be provided through a pull down menu or dialog box or other user input interface as is known. In one embodiment, an interface is provided where the user may specify all of the tab separator pages to be inserted in the document. This interface is available within or outside of a document allowing the user to create separator pages 700 as a separate document. A dialog box is presented to the user where the user may specify the ordered media attributes such as tab type, the number of tab cuts 702 in the tab set 712, the total number of tab separator pages 700 to be inserted in the document, the tab media size, the tab media orientation, the tab set 712 order, the tab labels 704 and appearance/formatting (font, style, position, orientation, etc.) thereof, the tab edge offset 710 and the tab cut left and right indents 706, 708 for each separator page. Once these attributes are specified, the software automatically creates the tab separator pages 700 which the operator can then insert into the document in the proper locations using the workflow software as described above. Alternatively, the dialog box may also allow the specification of the location within the document for each tab separator page 700 created.

For the tab type attribute, the user may specify cut tabs or bleed tabs. Bleed tabs may or may not be printed on tab cut type tab separator pages 700. The tab label 704 of a bleed tab is printed up to the very edge of the page or tab cut so that the printing, and therefore the separator page 700, is visible within a stack of pages by looking at the edge of the stack. Bleed tabs may be created on ordinary media by printing up to the very edge of the media or may be created on oversized media, by printing in a particular position on the media and the trimming the media down to size to achieve the same effect. While bleed tabs need not be created on ordered media, one will appreciate the application of the embodiments disclosed herein for the creation, insertion and visualization of pages within a document having ordered attributes. Further, when specifying bleed tabs, the fill percentage of the bleed area may also be specified as well to control the shade and appearance of the tab label 704.

The number of tab cuts 702 in the tab set 712 may be left blank to allow the operator of the production output device 122 to select the tab set 712 type. Where the number of tab cuts 702 in a tab set 712 is known, the software can use the total number of tab separator pages 700 used in the document to compute the number of remaining tabs in the last whole tab set when the total number of tab separator pages 700 is not an even multiple of the tab set 712. The software can then insert codes within the document that instruct the production output device 122 to automatically eject the unused tab separator pages 700 of the last set 712 prior to beginning production of the next copy of the document. Further, these codes may specify the output exit for the ejected tab separator pages 600 where more than one output exit is available on the production output device 122. The choice of output exit may further be specified by the operator as the pages 600 are to be ejected. Alternatively, the coding can cause the production output device 122 to instruct the operator to remove the unused separator pages 700. The tab media size and orientation may be specified or may be automatically determined from the rest of the document into which the tabs are to be inserted. Common tab media sizes include 8½×11, 9×11, 8½×11½, A4 tab and A4, although any media size supported by paper handling systems of the production output device 122 can be used, whether available now or later developed. The tab set 712 order specifies the order in which pre-collated tab separator pages 700 appear within a tab set 712 or the way they must be loaded into the production output device 122, such as first tab first ("FTF") or last tab first ("LTF"), to be produced in the proper order. The specification of the tab labels 704 and their appearance allows the user to specify the label text or images/icons for each separator page 700, font, font size, style and relative alignment (centered or justified) on the tab cut 702. These attributes may be specified as relative values to allow the production output device 122 or operator thereof to vary these values in the case where the tab set 712 type is unknown since the size of the tab cut 702 may change. For example, the production output device 122 can automatically ensure that tab labels 704 are centered on the tab cuts 702 no matter what tab set 712 type is used. The tab edge offset 710 specifies the margin between the tab label 704 and the edge of the tab cut 702. For the bleed type tab separator pages, the tab edge offset 710 will be zero. Further, for bleed type tabs without tab cuts 702, the tab cut left and right indents 706, 708 allow the user to specify the position of the tab label 704.

In an alternative embodiment, the operator may further specify a plex attribute of the tab separator pages 700. This allows the creation and labeling of one (simplex) or both (duplex) sides of the separator page 700 and/or tab cuts 702. The plex attribute may further specify which side of the separator page 700/tab cut 702 a particular label 704 is to be printed on or this may be automatically/dynamically determined. The operator can visually check and verify the labeling as it will appear on each side of the tab cut 702 or separator page 700 itself, or other ordered media. For bleed tabs, this allows for printing the tab label 704 in the same relative on both sides of the separator page 700 which makes label more visible within the document. Alternatively, the bleed tab labels for each side of a particular separator page 700 can appear in different positions. This functionality further takes into account that the bound and non-bound edges of the separator page changes relative to the content printed on the page depending on which side the user is viewing. In some cases, tab labels 704 are associated with the content on the page. Should editing, such as insertion or deletion, to other pages in the document cause the content of current separator page 700 to shift to the opposite face of the page, functionality is provided to automatically move the tab label 704 to the proper edge or allow the operator to manually do so. This prevents the tab label 704 from accidentally being printed on the bound edge of the document while keeping it properly located with its associated content.

Further, automated tab separator page 700 generation may be provided to automatically generate tab separator pages 700 in commonly or frequently used configurations. For example, a selection may be provided to have the software automatically create tab separator page 700 inserts such as monthly tabs (where each tab separator page 700 is labeled with one of the twelve months of the year), alphabetical tabs (where each tab separator page 700 is labeled with a letter), such as for use in a directory, quarterly tabs (where each tab separator page 700 is labeled with a calendar quarter), such as for use in a financial report, or numerical tabs (where each tab separator page 700 is labeled with a numeral). Further, an automated label 704 set configuration may be custom defined by the user and stored for repeated use as a frequently used configuration.

In an alternative embodiment, tab separator pages 700 may be automatically generated based on bookmarks stored within the document printer ready pdf file. When converting documents from proprietary word processing formats, such as Microsoft Word, to the printer ready format, such as pdf, section headings or other markers/descriptors within the document can be automatically converted to bookmarks. Bookmarks make it easier to electronically locate portions of the document quickly when viewing or editing the document. The disclosed embodiments provide functionality to read these bookmarks from the printer ready document file and automatically convert them to labeled tabbed separator pages 700 inserted at the proper locations. This extends the automated workflow from document conversion through to tab creation, simplifying the operator's job in preparing the document for final production. Once the tab separator pages 700 are created and inserted, the operator can utilize the functionality disclosed above to edit and manipulate the tab separator pages and prepare them for output on the production output device 122 as disclosed.

The interface may further allow the user to specify tab separator pages 700 one at a time within another document. This would allow the user to add tab separator pages 700 on the fly as they edit the document. As tab separator pages 700 are inserted, the user is informed of the tab separator page 700 order and the total number of tab separator pages 700 inserted. This allows the user to keep track of the tab separator pages 700 used and figure out the best tab set 712 type to use.

As described above, the selection of a tab separator page 700 in a document displays a visual representation of that separator page 700 and its attributes in the viewer 306. This allows the user to verify the attributes, such as the label position and formatting. Further, the selected tab separator page 700 may further be visually represented in relation to the other tab separator pages 700 inserted in the document, such as by displaying all of the tab cuts 702 in relation to the tab cut 702 of the selected page so that the user may verify the tab cut 702 positions and ensure proper overlap, or lack thereof.

As was discussed above, tab or ordered media information comprise page features which are encoded within the document to instruct the operator and or control the production output device 122. These page features may be set in such a way as to allow production output device 122 or operator to change/override tab set 712 types or other tab attributes and have the tab separator pages 700 automatically adjust accordingly at production.

In still another embodiment, functionality is included in the workflow management software to make efficient use of different production output devices with differing capabilities needed for a given job and different operating costs. Such differing capabilities include the ability to print in color or black and white, the ability to print at very high resolution or on oversize paper stock. For example, there is a growing use of combining color pages with black and white ("B&W") pages in the same document as a final printed product. This combination of B&W and color pages in a single document brings constraints on the production output device for producing the printed output. If this single document is sent to a color printing device, it will be printed, but at a very high cost since color printing is typically more expensive than B&W printing. If sent to a B&W printing device, the job will be printed at reasonable cost but the color pages will not be produced in color. Another alternative is to manually split the job into two separate jobs, sending the color pages to the color printer and the B&W pages to the B&W printer and then collate the output of each printer into the final product. This becomes a complicated process when the customer desires a high volume of finished product. Further, the insertion of manual collation steps makes it difficult to take advantage of automated finishing systems.

In a preferred embodiment, the operator is given the opportunity to flag pages in the document for production on specific output devices or resources at the job preparation stage by setting a specially defined page attribute associated with the particular page. The attribute indicates the desired or necessary capabilities of the production output device in order to produce that page with the intended results. For example, the attribute can indicate that a production output device with color capability is desired or needed. This allows the operator to determine and optimize specific pages to take advantage of the capabilities of the different production output devices available. Typically, the majority of the document will be produced on one device with a small subset of pages needing to be diverted to a different device, e.g. a small number of color pages within a large black and white document. The operator further defines which pages are part of the main body of the document and which are the exceptions to be produced separately.

When the job is submitted to the print server, the print server detects the flags/attributes and appropriately and automatically diverts the pages to their appropriate production output device. The print server includes a receiver which receives the document and passes the document to a resource allocator logic which reads the pages and interprets the special page attribute. The resource allocator can be implemented in software, hardware or a combination thereof. The resource allocator is programmed to know about the different output resources/devices available to the shop (inside or outside via network for example) and their corresponding capabilities. The resource allocator interprets the special attribute and then attempts to match an appropriate output resource that has the desired or necessary capability to produce that particular page. The resource allocation can be completely automated or manual or a combination thereof.

If a particular capability is desired or necessary but that capability is not available on any of the print resources in the shop or there is too big a queue for the particular resource, the resource allocator can make a determination, either automatically or with manual operator intervention, of how best to print that particular page. Further, the resource allocator can include "policies" or pre-defined rules for handling particular capability "requests". A policy can be implemented to force the whole document to print on a particular resource, ignoring the special attribute of those pages with the attribute set. In addition, a policy can be set to always "satisfy the capability request" and route pages to resources with the desired capability. Further, a policy can be set to request manual operator intervention when a page with a specially requested capability passes through the resource allocator to have the operator determine the best course of action. Once the print resource for the page is determined, the page is passed to a distribution engine which transmits the page to the print resource for final output.

When printing the pages, the print server will stall the main body of the document while the exception pages are produced on the alternate output device. The print server then indicates to the operator to retrieve the exception output and place it in the collating apparatus or document assembler of the printing device which will be used to print the main body. Once this is complete, the print server sends the main body to the production device and, in addition, where a exception page was located, the print server instructs the production device to collate or assemble from the exception output the requisite finished page. This results in a complete finished product with minimal operator intervention. It will be appreciated that numerous alternatives can be used such as a mechanical link between the production output devices which transfers the finished output of one device to the auto-collator/assembler of another device for collating/assembling back into the main document. Further now that the finished document is contained within one production output device, in-line finishing equipment, such as staplers or other binding equipment, can be used to produce the final output.

It is therefore intended that the foregoing detailed description be regarded as illustrative rather than limiting, and that it be understood that it is the following claims, including all equivalents, that are intended to define the spirit and scope of this invention.

We claim:

1. An interface, implemented in a computer, for representing and controlling a production printing workflow comprising:
    a display;
    a first document object representing a document, said document further comprising content and formatting, said formatting defining at least one page in said document, said first document object being associated with a first visual representation on said display;
    a page object representing an ordered media attribute of one of said at least one page, said page object being associated with a second visual representation on said display and capable of being associated with said first document object;
    a first user input device for selectively associating said first and second visual representations; and
    a second user input device for creating said page object, said second user input device operative to allow selection of said ordered media attribute, setting of at least one value of said ordered media attribute and selection of one or more of said at least one page in said document to apply said ordered media attribute to wherein upon application, one or more of said page objects are created and associated with each of said one or more of said at least one page and said corresponding document object;
    wherein association of said first and second visual representations results in association of said respective objects; and
    further wherein said applied ordered media attribute is visually represented on a visual representation of said one or more of said at least one page.

2. The interface of claim 1, wherein said association of said page object with one of said at least one page in said document in said first document object is operative to cause said ordered media attribute to apply to said one of said at least one page.

3. The interface of claim 1, wherein said second user input device comprises a menu represented on said display and coupled with said first user input device.

4. The interface of claim 1, wherein said second user input device comprises a dialog box represented on said display and coupled with said first user input device.

5. The interface of claim 1, wherein said second user input device is further operative to allow said selecting by drag and drop of said first visual representation on a third visual representation of said one or more of said at least one page.

6. The interface of claim 1, wherein said ordered media attribute comprises a tab separator page attribute, said visual representation of said one or more of said at least one page visually represents at least one tab cut on said one or more of said at least one page.

7. The interface of claim 6, wherein said visual representation of said one or more of said at least one page further visually represents at least one tab label, and a location of said at least one tab label on said at least one tab cut substantially as it will appear when printed.

8. The interface of claim 1, wherein said at least one value of said ordered media attribute comprises at least one of tab type, tab media size, number of tab cuts in tab set, tab media orientation, total number of tab separator pages, tab label formatting, tab label edge offset, tab cut left indent, tab cut right indent, tab output order and at least one tab label value.

9. The interface of claim 8, wherein said tab type further comprises a value specifying cut tabs.

10. The interface of claim 8, wherein said tab media size further comprises a value specifying 9×11, 8½×11, A4 tab or A4.

11. The interface of claim 8, wherein said number of tab cuts comprises the number of tab pages contained in an ordered tab set.

12. The interface of claim 8, wherein said tab output order further comprises a value specifying first-tab-first or last-tab-first.

13. The interface of claim 1, wherein said second user input device is further operative to allow said user to automatically set said at least one value for one of at least one frequently used tab configuration.

14. The interface of claim 13, wherein said at least one frequently used tab configuration includes monthly tabs, alphabetic tabs, quarterly tabs and numerical tabs.

15. An interface, implemented in a computer, for representing and managing creation and insertion of ordered media into a document in a production printing workflow management system, said system comprising a display, said document comprising a ready for printer format specifying content and formatting, said formatting defining at least one page in said document, said interface comprising:
- a first user input device for receiving at least one ordered media attribute, said at least one ordered media attribute specifying at least one ordered media page to be inserted in said document;
- first program logic coupled with said first user input and operative to generate said ordered media page into said document according to said at least one ordered media attribute; and
- a first output device operative to display a visual representation of said at least one ordered media page on said display according to said at least one ordered media attribute.

16. The interface of claim 15, wherein said first user input device comprises a dialog box represented on said display.

17. The interface of claim 15, wherein said ready for printer format comprises a portable document format.

18. The interface of claim 15, wherein said at least one ordered media page comprises at least one tab separator page.

19. The interface of claim 18, wherein said at least one ordered media attribute comprises tab type.

20. The interface of claim 19, wherein said tab type comprises a value specifying cut tabs.

21. The interface of claim 18, wherein said at least one ordered media attribute comprises tab media size.

22. The interface of claim 21, wherein said tab media size comprises a value specifying 9×11, 8½×11, A4 tab or A4.

23. The interface of claim 18, wherein said at least one ordered media attribute comprises number of tab cuts.

24. The interface of claim 23, wherein said number of tab cuts comprises the number of tab separator pages in an ordered tab set.

25. The interface of claim 18, wherein said at least one ordered media attribute comprises tab media orientation.

26. The interface of claim 18, wherein said at least one ordered media attribute comprises total number of tab separator pages in said document.

27. The interface of claim 18, wherein said at least one ordered media attribute comprises tab label edge offset.

28. The interface of claim 18, wherein said at least one ordered media attribute comprises tab cut left indent.

29. The interface of claim 18, wherein said at least one ordered media attribute comprises tab cut right indent.

30. The interface of claim 18, wherein said at least one ordered media attribute comprises tab output order.

31. The interface of claim 30, wherein said tab output order comprises a value specifying first-tab-first or last-tab-first.

32. The interface of claim 18, wherein said at least one ordered media attribute comprises at least one tab label value.

33. The interface of claim 18, wherein said first user input device is further operative to receive a specification of a frequently used tab separator page configuration, said interface further comprising second program logic coupled with said first user input device and operative to generate said at least one ordered media attribute to produce said frequently used tab separator page configuration.

34. The interface of claim 33, wherein said frequently used tab separator page configuration comprises one of monthly labeled tab separator pages, alphabetically labeled tab separator pages, quarterly labeled tab separator pages or numerically labeled tab separator pages.

35. A method of representing and managing creation and insertion of ordered media into a document in a production printing workflow management system, said system comprising a display, said document comprising a ready for printer format specifying content and formatting, said formatting defining at least one page in said document, said method comprising:
- (a) receiving at least one ordered media attribute, said at least one ordered media attribute specifying at least one ordered media page to be inserted in said document;
- (b) generating said ordered media page into said document according to said at least one ordered media attribute; and
- (c) displaying a visual representation of said at least one ordered media page on said display according to said at least one ordered media attribute.

36. The method of claim 35, wherein said receiving is performed using a dialog box represented on said display.

37. The method of claim 35, wherein said ready for printer format comprises a portable document format.

38. The method of claim 35, wherein said at least one ordered media page comprises at least one tab separator page.

39. The method of claim 38, wherein said at least one ordered media attribute comprises tab type.

40. The method of claim 39, wherein said tab type comprises a value specifying cut tabs.

41. The method of claim 38, wherein said at least one ordered media attribute comprises tab media size.

42. The method of claim 41, wherein said tab media size comprises a value specifying 9×11, 8½×11, A4 tab or A4.

43. The method of claim 38, wherein said at least one ordered media attribute comprises number of tab cuts.

44. The method of claim 43, wherein said number of tab cuts comprises the number of tab separator pages in an ordered tab set.

45. The method of claim 38, wherein said at least one ordered media attribute comprises tab media orientation.

46. The method of claim 38, wherein said at least one ordered media attribute comprises total number of tab separator pages in said document.

47. The method of claim 38, wherein said at least one ordered media attribute comprises tab label edge offset.

48. The method of claim 38, wherein said at least one ordered media attribute comprises tab cut left indent.

49. The method of claim 38, wherein said at least one ordered media attribute comprises tab cut right indent.

50. The method of claim 38, wherein said at least one ordered media attribute comprises tab output order.

51. The method of claim 50, wherein said tab output order comprises a value specifying first-tab-first or last-tab-first.

52. The method of claim 38, wherein said at least one ordered media attribute comprises at least one tab label value.

53. The method of claim 38, further comprising:
(d) receiving a specification of a frequently used tab separator page configuration; and
(e) generating said at least one ordered media attribute to produce said frequently used tab separator page configuration.

54. The method of claim 53, wherein said frequently used tab separator page configuration comprises one of monthly labeled tab separator pages, alphabetically labeled tab separator pages, quarterly labeled tab separator pages or numerically labeled tab separator pages.

* * * * *